(12) United States Patent
Nasato

(10) Patent No.: US 6,508,998 B1
(45) Date of Patent: *Jan. 21, 2003

(54) TEMPERATURE MODERATION OF AN OXYGEN ENRICHED CLAUS SULFUR PLANT USING AN EJECTOR

(75) Inventor: Elmo Nasato, Tyler, TX (US)

(73) Assignees: Gaa Engineered Systems, Inc., Tyler, TX (US); Air Products and Chemicals, Inc., Allentown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1008 days.

(21) Appl. No.: 08/741,868

(22) Filed: Oct. 28, 1996

(51) Int. Cl.[7] ............................................... C01B 17/04
(52) U.S. Cl. .................................. 423/573.1; 423/576.8
(58) Field of Search ........................ 423/576.8, 574.1, 423/573.1

(56) References Cited

U.S. PATENT DOCUMENTS

| | | | |
|---|---|---|---|
| 3,681,024 A | 8/1972 | Hujsak et al. | 23/225 |
| 3,822,341 A | 7/1974 | Smith | 423/574 |
| 4,153,674 A | 5/1979 | Verloop et al. | 423/573 R |
| 4,526,590 A | 7/1985 | Palm et al. | 55/27 |
| 4,552,747 A | 11/1985 | Goar | 423/574 R |
| 4,756,900 A | 7/1988 | Pendergraft et al. | 423/574 R |
| 4,844,881 A * | 7/1989 | Gens et al. | 423/574 R |
| 5,508,013 A * | 4/1996 | Kvasnikoff et al. | 423/220 |

OTHER PUBLICATIONS

Perry et al. "Chemical Engineers' Handbook", 5th Edition, McGraw Hill Book Co. USA, pp. 5–19,6–15, 6–24, 6–25 and 6–29 to 6–32; ISBN 0–07–049478–9, 1973 no month.*

"Oxygen Use in Claus Sulfur Plants" by M. R. Gray and W. Y. Svrcek Gas Conditioning Conference Report. Norman, Oklahoma U.S.A. Mar. 2–4, 1981, 18 pages.

"Fundamentals of Sulfur Recovery by the Claus Process" by B. Gene Goar, (Mar. 7–9, 1977) Proceedings of the Gas Conditioning Conference at Norman, Oklahoma by the University of Oklahoma.

"Claus Plant Oxygen Enrichment" (1983) by Linde of Union Carbide. No month.

* cited by examiner

Primary Examiner—Steven Bos
Assistant Examiner—Timothy C Vanoy
(74) Attorney, Agent, or Firm—Sonnenschein, Nath & Rosenthal

(57) ABSTRACT

A process is set forth for improving an oxygen-enriched Claus plant by recycling through an ejector effluent from the first condenser back to the reaction furnace to moderate oxygen induced high temperatures and thus allow additional oxygen-enrichment and attendant throughput in the Claus plant.

12 Claims, 1 Drawing Sheet

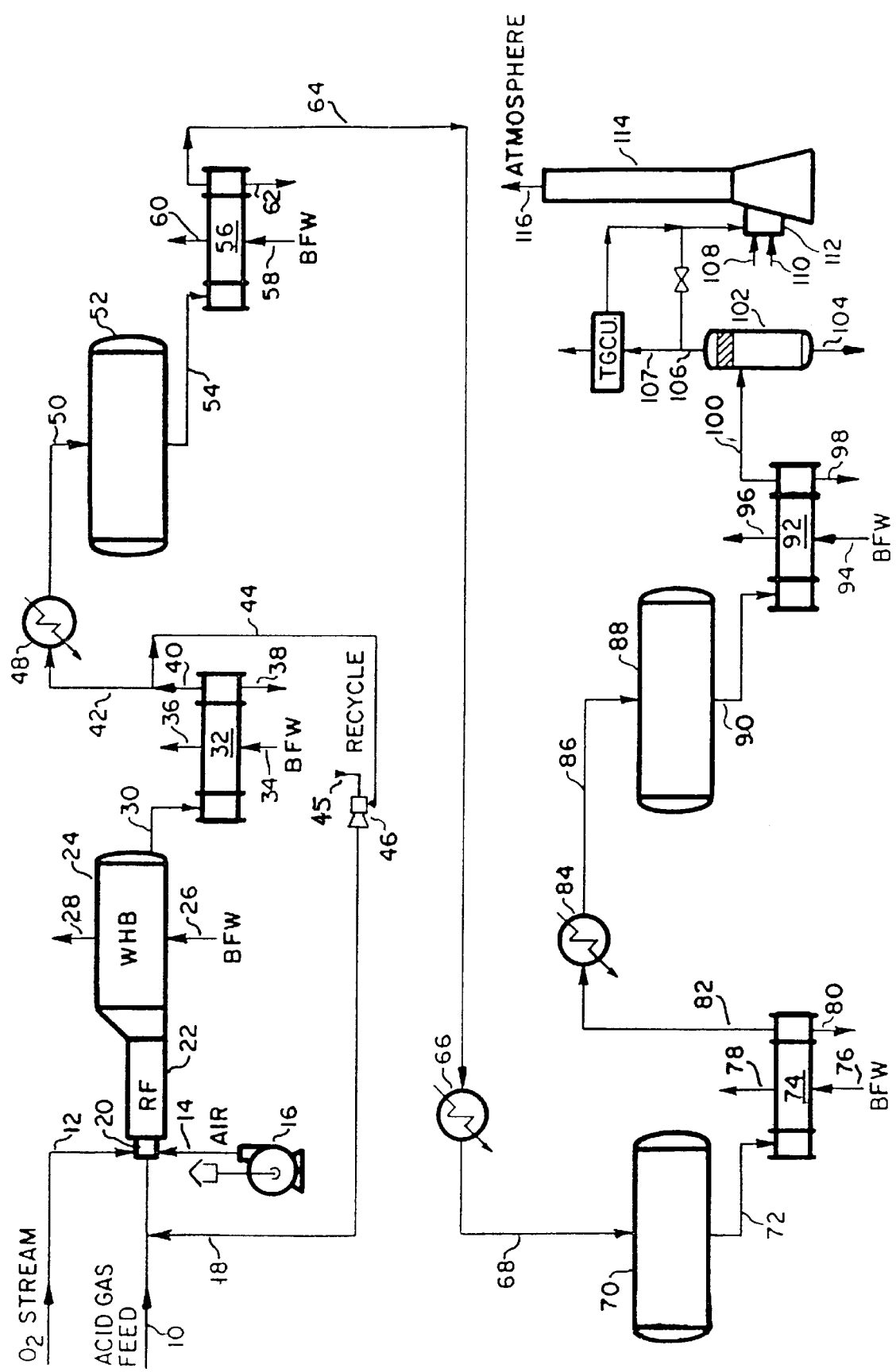

US 6,508,998 B1

TEMPERATURE MODERATION OF AN OXYGEN ENRICHED CLAUS SULFUR PLANT USING AN EJECTOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is directed to the recovery of elemental sulfur from hydrogen sulfide containing gas streams. More specifically, the present invention is directed to improvements in a Claus sulfur plant using oxygen enrichment and recycle of gases using an ejector to increase capacity and moderate flame temperatures in the reaction furnace.

It is known in the prior art to recover elemental sulfur from hydrogen sulfide containing gas streams as is set forth in the article "Fundamentals of Sulfur Recovery by the Claus Process" by B. Gene Goar, published in the 1977 Gas Conditioning Conference Report.

It is also known to use oxygen enrichment in the operation of a Claus sulfur plant in order to increase the capacity of hydrogen sulfide handled as well as the total throughput of the plant as set forth in the article "Oxygen Use in Claus Sulfur Plants" by M. R. Gray and W. Y. Svrcek published in the 1981 Gas Conditioning Conference Report. In that article it was disclosed that oxygen can be added to the air feed to the burner of the reaction furnace in order to increase the amount of hydrogen sulfide which is combusted to sulfur dioxide for later catalytic conversion with additional hydrogen sulfide to the elemental liquid sulfur product of the Claus process. The article recites that the maximum capacity increase which can be achieved with oxygen enrichment is determined by the pressure drop through the plant and the reactor space velocities. However, a further limitation set forth in the article is that for a given plant stream, temperatures and sulfur condenser capacity may limit the potential capacity increase using oxygen enrichment. Specifically, stream temperatures in the reaction furnace and in the converter beds may increase due to oxygen enrichment and in fact such increase from oxygen enrichment reaches the maximum tolerable temperature of the materials used in such a furnace, namely the refractory lining.

In the 1983 publication by Linde of Union Carbide entitled "Claus Plant Oxygen Enrichment", it is noted that oxygen-enrichment limitations exist for rich $H_2S$ streams due to temperature limits in the furnace or waste heat boiler of a Claus plant.

U.S. Pat. No. 3,681,024 discloses the addition of oxygen and a recycle gas to a Claus furnace where the recycle gas is delivered by a blower.

U.S. Pat. No. 3,822,341 describes a Claus plant using oxygen enrichment in which one source of oxygen is initially used to strip residual $SO_2$ from a sidestream in vessel 92 before the oxygen stream in line 96 is optionally recycled to be included with the oxygen in line 12 going to the combustion zone of the waste heat boiler 8. As recited at col. 5, lines 65–68 of the specification. Because the oxygen content of such a stream is completely consumed in an exothermic reaction this stream can not be utilized as a moderating medium for the flame temperature of the reaction furnace. As described by Goar, Claus sulfur plants typically have an adiabatic reaction furnace followed by a waste heat boiler. The excessive temperature problem with oxygen enriched operation occurs in the adiabatic reaction furnace. U.S. Pat. No. 3,822,341 ignores the existence of this problem.

U.S. Pat. No. 4,153,674 discloses a Claus plant and tailgas cleanup plant wherein a gas stream in line 20 is removed from the tailgas system and is returned or recycled to the front end of the Claus plant 7. This patent does not consider oxygen enrichment or flame temperature moderation by a recycle stream. Also the tail gas is reacted to convert all sulfur to hydrogen sulfide which is absorbed, stripped and returned to the Claus plant.

U.S. Pat. No. 4,552,747 is a process for recycle moderation of the high temperatures in the Claus furnace induced by oxygen-enrichment by recycling an effluent stream from the first condenser. The recycle uses a mechanical blower.

U.S. Pat. No. 4,526,590 describes a sulfur recovery process with separate sulfur and water condensation.

U.S. Pat. No. 4,756,900 discloses a process for splitting the effluent from the waste heat boiler of a Claus furnace and recycling a portion thereof using a separate sulfur condenser and a mechanical blower to moderate the high furnace temperatures induced by oxygen enrichment.

The present invention overcomes the shortcomings of the prior art by increasing throughput of a Claus plant by oxygen enrichment to an extent beyond that contemplated in the prior art due to flame temperature limitations using a safer method and less mechanical and capital resources. This is achieved by the recycle of an intermediate gas stream from the first condenser in the Claus train to moderate the temperature in the flame of the burner of the reaction furnace using an ejector.

BRIEF SUMMARY OF THE INVENTION

The present invention is directed to a process for recovering sulfur from a feed gas stream rich in hydrogen sulfide wherein the gas stream is partially combusted with an oxygen-enriched gas in a Claus reaction furnace, the combustion effluent is cooled with the attendant condensation and separation of sulfur in the first condensation zone and the remaining effluent stream is passed through at least one stage of reheating, conversion in a catalytic Claus reaction zone and cooling with attendant condensation and separation of sulfur in an additional condensation zone, recycling a portion of the combustion effluent to the reaction furnace zone to moderate the temperature of the reaction furnace zone wherein the improvement comprises performing the recycle with the motive power of a high pressure stream in an ejector where the recycle stream is the suction stream to the ejector.

Typically the process uses three stages of reheating, conversion and cooling and separation subsequent to the first condensation zone.

The process is relevant for hydrogen sulfide containing streams wherein the sulfide is in the range of 60 to 100 mole %. Preferably the hydrogen sulfide content of the feed gas is 80 to 100 mole %.

Preferably the oxygen enrichment of the reaction furnace is in the range of 32 to 100 mole %, more specifically 40–75 mole %.

The recycle stream flow rate should be in the range of 5 to 60% of the combustion effluent stream from the first condensation zone.

Preferably the temperature of the reaction furnace zone is maintained in the range of 2400 to 2800° F.

The invention also is directed to a system for recovering sulfur from a feed gas stream rich in hydrogen sulfide by the Claus reaction including a reaction furnace for partially combusting the feed gas stream with an oxygen enriched gas, a first condensing means for cooling and condensing sulfur from the combustion effluent, at least one train comprising a reheater means, a catalytic Claus reactor and an additional condensing means, means for rewarming, further reacting and recovering sulfur from said effluent, recycle means for recycling a portion of the combustion effluent to said reaction furnace wherein the improvement comprising the recycle means is an ejector.

Preferably the system has a recycle means constituting a conduit just downstream of the first condenser for recycling a portion of the combustion effluent gas through the conduit and delivered by a recycle ejector through a subsequent conduit to the reaction furnace of the Claus plant system.

BRIEF DESCRIPTION OF THE DRAWINGS

The drawing is a schematic representation of the oxygen-enrichment and effluent recycle embodiment of a Claus plant.

DETAILED DESCRIPTION OF THE INVENTION

Claus sulfur recovery systems are widely utilized to recover sulfur from acid gas streams produced in natural gas purification and in petroleum refineries, primarily from amine sweetening. In refineries, the hydrogen sulfide is in crude oil and is contained in hydrocarbon desulfurization unit off gases and fluidized catalytic cracker unit off gases. Often times the acid gas stream produced from the amine unit is quite rich in hydrogen sulfide, particularly in petroleum refineries, where it may be 80–95 mole % hydrogen sulfide. Also in many refineries, the Claus plant units are either fully loaded or subject to becoming fully loaded (capacity limited) due to the processing of heavy crude oils, which contain relatively large amounts of sulfur compounds. With the dwindling known reserves of refinable hydrocarbons and crude oils, less attractive known oil reserves are now being processed, which less attractive oil reserves typically have high sulfur contents. The trend in refining such high sulfur containing feedstocks will increase in the future. Therefore a method for increasing the capacity of Claus plants to process sulfur is needed.

As Claus sulfur recovery unit feed rates are increased above capacity several problems develop. At increased flow the pressure drop through the Claus plant and tail gas cleanup unit increases and the back pressure increases required $H_2S$ and air feed inlet pressures beyond what is available from the amine regenerator that supplies the $H_2S$ feed and the air blower that provides feed air. The increased flow also increases the space velocity in the reaction furnace and the catalytic reactor stages which reduces conversion to sulfur and increases emissions to the tail gas cleanup unit. The increased flows to the tail gas cleanup unit increases its pressure drop and further lowers tail gas sulfur recovery to give increased and usually unacceptable sulfur emissions. The increased back pressures may in some Claus plants pose the risk of blowing the liquid sulfur drain seals which would release noxious, toxic $H_2S$ into the area. While booster blowers for the $H_2S$ and air feeds, and higher pressure sulfur liquid drain seals can provide some increase in capacity, the reduced sulfur conversion and increased sulfur emissions remain.

One method which may be used to increase the capacity of an existing Claus plant is the use of oxygen to enrich the air stream to the reaction furnace of the plant from 21 mole % oxygen which is the content of air, up to 70–90 mole % oxygen or higher. Any increase in oxygen content of the air stream effectively reduces the nitrogen content of gases passing through the Claus plant and increases its throughput capacity for sulfur by diminishing the gas volume of inerts, namely nitrogen which must also be passed through the equipment. Typically, a Claus plant handling 80–95 mole % hydrogen sulfide acid gas needs an increase in capacity of 50–100%, yet only enough oxygen can be added to the air stream to get a 15–25% increase in capacity because flame temperature limitations of the fire brick and refractory in the reaction furnace limit the amount of oxygen which may be added. This results because of the increase in flame temperature when oxygen is added to the air stream.

If the acid gas stream contains 90 mole % hydrogen sulfide and the Claus plant is performing a typical burn of only one third of the hydrogen sulfide (one third of fully stoichiometric air requirements) and the burner is receiving air (21 mole % oxygen) then the calculated theoretical adiabatic flame temperature should be about 2400° F. If the air stream is enriched with oxygen to 40 mole % oxygen, the calculated adiabatic theoretical flame temperature should increase to about 3150° F. Again, if the air stream is enriched with oxygen, but this time to 70 mole % oxygen, the calculated theoretical adiabatic flame temperature should increase to about 3750° F. However, most better quality fire brick and refractory material installed in Claus plant reaction furnaces are good for a maximum continuous operating temperature of only 2700 to 2800° F. if they have an alumina content of 85–90 wt% or greater. Therefore, it may be seen from the above calculations that only a limited oxygen enrichment, 30–32 mole % oxygen of the airstream can be used and still hold the temperature below a maximum of 2800° F. With the small reduction of nitrogen input when increasing the air stream oxygen content from 21–32 mole % oxygen, only a slight increase in Claus plant capacity is realized, approximately 15 to 25% capacity.

The present invention however, permits increasing the oxygen enrichment to above 32 mole % to increase capacity of an existing Claus sulfur recovery unit further by recycling combustion effluent by an ejector, after cooling to separate sulfur liquid, to moderate the reaction furnace temperature to avoid excessively high temperature. In practice the recycle rate would be set to provide dilution and cooling to control the reaction furnace temperature in the 2400–2800° F. range. With this technique hydrogen sulfide feed and sulfur recovery capacity can be increased by 50–100 mole % or more by enriching the air stream to 70 mole % oxygen when handling 90 mole % hydrogen sulfide acid gas feed. The ejector is also known in the industry as an eductor or thermocompressor.

By recycling a portion of the reacted and cooled reaction furnace stage sulfur condenser effluent gas through an ejector to the input of the reaction furnace, particularly at the acid gas feed line to the burner, the flame temperatures associated with very high oxygen enrichments necessary to effect significant throughput increases are moderated by the relatively cool and reacted recycle gas emanating from the condenser. Alternately, the recycle could be added directly to the burner or to the air feed. The combination of oxygen enrichment and this intermediate ejector-powered recycle provides an unexpected potential enhancement of capacity or throughput for a Claus plant. Such a process configuration could be provided as a retrofit to a capacity limited existing Claus plant system or it could be provided in a smaller size new installation taking into account the increased capacity freedom provided by the oxygen enrichment and intermediate recycle attributes. At first glance it may appear that the increased flow from the recycle stream will increase the Claus plant system pressure drop and reintroduce the pressure drop limitation which oxygen enrichment alleviated. This is not correct as can be seen from the Table which compares a bottlenecked air operation prior art system with the system debottlenecked using oxygen enrichment and intermediate recycle. The Table shows that going from the Case 1 bottlenecked air operation to the Case 2 debottlenecked oxygen with intermediate recycle operation, the reaction furnace pressure differential is increased from 1.9 to 2.8 psi for the debottlenecked Case 2. However, the catalytic stages and the tailgas unit pressure drops are reduced from 9.1 to 4.0 psi for Case 2 because of the decrease in nitrogen flow through the stages. At the same time, overall sulfur recovery in the Claus unit has increased from 97.7 to 98.3% for the debottlenecked Case 2. The tailgas unit sulfur recovery would also increase at the lower flow rates and longer contact times.

While this discussion has shown that oxygen enrichment and the ejector-powered recycle technique of this invention can be used to increase the capacity of an existing plant, the same technique can be used in the design of new Claus sulfur recovery units to decrease the size of equipment required for a given capacity below what would be required for air operation. In particular, the reduction of air input with consequent decrease in nitrogen input decreases the size and cost of the tail gas cleanup unit.

TABLE

| Case Description | 1 Bottle-necked Air Operation | 2 Debottle-necked Enriched Air Operation |
|---|---|---|
| Sulfur Capacity, long tons/day | 130 | 200 |
| Air $O_2$ concentration, vol. % | 21 | 70 |
| ΔP Reaction Furnace Stages, $P_2$–$P_7$ | 1.9 | 2.8 |
| ΔP Catalytic Stages, $P_7$–$P_{18}$ | 5.1 | 2.5 |
| ΔP TGCU, $P_{18}$–$P_{atm}$ | 4.0 | 1.5 |
| ΔP Total | 11.0 | 6.8 |
| Inlet Pressure, psig | 11.0 | 6.8 |
| Sulfur Recovery, % | 97.7 | 98.3 |

This invention utilizes an ejector in place of the prior art mechanical blower. The ejector can utilize steam, compressed air, compressed nitrogen, compressed carbon dioxide, compressed sulfur dioxide or similar gases as the motive stream. High pressure steam is the preferred motive stream.

The temperature moderation is achieved by a combination of the effluent from the first condenser plus the motive stream from the ejector. The motive stream component of the recycle will contribute to the net forward flow downstream of the first condenser(s).

The ejector is located at an elevation above the first condenser(s) and reaction furnace to allow sloped piping from the condenser which is self draining, thus eliminating the need for an additional sulfur seal and drain. The preferred configuration has a fully steam jacketed ejector, with steam jacketed ejector suction line, and steam jacketed or traced ejector discharge line. Two or more parallel or series connected ejectors may be utilized, where appropriate.

The use of booster blowers or recycle blowers for streams that contain $H_2S$ pose an operational risk. The use of mechanical rotating equipment with $H_2S$ bearing streams adds to operational complexity, higher maintenance requirements and thus higher operating risk and cost.

In utilizing an ejector system in place of a mechanical blower the following benefits are achieved;

Process Considerations a) In utilizing high pressure steam as the motive stream, the following benefits can be achieved over a mechanical blower:
  i) The motive steam $H_2O$ molecule contributes to improved radiant heat transfer in the Waste Heat Boiler;
  ii) Due to the net forward flow of the motive stream, heat transfer coefficients in heat exchanger equipment downstream of the first condenser will be improved. Systems utilizing high levels of oxygen enrichment and a recycle blower unload the sulfur recovery unit (SRU) downstream of the first condenser to the point where overall heat transfer coefficients may be adversely affected;
  iii) High pressure steam let down across the ejector will result in superheating which will minimize the chance of steam condensation in the ejector discharge pipe;
  iv) The process recycle piping can be smaller;
  v) An ejector is capable of delivering more differential pressure than a single stage mechanical blower;
  vi) The net forward flow of water vapor in the sulfur recovery unit has negligible impact on overall Claus sulfur recovery (less than 0.1% reduced sulfur recovery) and negligible impact on the tailgas cleanup unit dehydration (+5 to 10% increase in water).

b) In utilizing high pressure air as the motive stream, the following benefits can be achieved over a mechanical blower:
  i) The oxygen component of the air is a consumed reactant in the reaction furnace, and thus only the nitrogen is a net forward flow. Net forward nitrogen flow will have negligible impact both on sulfur recovery unit sulfur recovery, and the tailgas cleanup unit performance;
  ii) same benefits as documented above in (a) ii (lesser degree), iv and v.

c) In utilizing high pressure nitrogen or carbon dioxide as the motive stream, the following benefits can be achieved over a mechanical blower:
  i) Net forward nitrogen or carbon dioxide flow will have negligible impact both on sulfur recovery unit sulfur recovery, and the tailgas cleanup unit performance;
  ii) For carbon dioxide, benefits are as documented in (a) i, ii, iv, v
  iii) For nitrogen, benefits are as documented in (a) ii, iv, v.

d) In utilizing high pressure sulfur dioxide as the motive stream, the following benefits can be achieved over a mechanical blower:
  i) The sulfur dioxide is a combustion product and consumed reactant in the reaction furnace, and thus the sulfur dioxide motive stream would help unload the sulfur recovery unit in a similar fashion to increased oxygen concentration;

ii) For sulfur dioxide, benefits are as documented in (a) i, iv, v.

Cost a) Purchase price of a steam jacketed ejector is less than a mechanical recycle blower and motor.

b) Installed cost of an ejector system is less than a mechanical blower. There are no electrical costs associated with an ejector, less instrumentation is required, and civil and mechanical design requirements are significantly less for the ejector than the rotating blower equipment.

c) Operating costs and maintenance costs are lower for an ejector system. The ejector is essentially maintenance-free; whereas, blowers require substantial maintenance costs as characteristic of rotating equipment.

d) Where space limitation is an issue, the ejector requires no ground space; while a blower/motor assembly requires significant space.

Redundancy a) Installation of an ejector system with redundancy is easier and less expensive than a mechanical blower system. As examples, the ejector redundancy can be achieved by installing 2-100% units, or 3-50% units.

Safety a) The ejector system has no rotating equipment: By their nature, mechanical blowers in sour service require more maintenance and attention to safety related issues. Mechanical blowers have seals which, over time, are vulnerable to leaking.

b) Mechanical blowers are installed at grade below the first condenser and reaction furnace thus resulting in a trap in the piping system. Accumulated condensed liquid sulfur must be collected, trapped and drained to the sulfur pit. The ejector system can be installed in an elevated position to eliminate all traps in the process lines, and to be sloped to facilitate a self draining pipe system.

The high pressure motive fluid for the ejector can be in the range of 65 to 650 psia. The suction fluid for the ejector can be in the range of 16 to 27 psia. The pressure differential between the motive fluid and the suction fluid should be in the range of 38 to 634 psi.

The present invention will now be described in greater detail with reference to a preferred embodiment which is illustrated in the figure. An acid gas feed stream is introduced into the Claus system in line 10 having a hydrogen sulfide content of 92 mole %. The feed is at a temperature of 100° F. and a pressure of 25 psia. A recycle stream in line 18 is introduced into the acid gas feed stream 10 wherein the recycle stream comprises predominantly steam with lesser amounts of nitrogen, hydrogen sulfide, sulfur dioxide, carbon dioxide and hydrogen. The recycle is at approximately 350° F. The mixed gas stream is introduced into burner 20 along with air provided in line 14 at elevated pressure from compressor 16, as well as an oxygen stream 12 provided from any convenient source of commercially pure oxygen. The reactants are combusted in burner 20 and evolved into the reaction furnace 22 where the reactions of the Claus process occur. Specifically, in the burner hydrogen sulfide and oxygen combine to produce sulfur dioxide and water wherein one third of the reaction feed is initially combusted and the remaining two thirds react with the sulfur dioxide produced to produce sulfur and water according to the following formulas:

$$H_2S + 3/2\ O_2 \rightarrow SO_2 + H_2O$$

$$2H_2S + SO_2 \rightarrow 3/2\ S_2 + 2H_2O$$

Some hydrogen is also produced by hydrogen sulfide dissociation.

$$2H_2S \rightarrow 2H_2 + S_2$$

The reactor furnace effluent then passes through a circuitous heat exchange zone or waste heat boiler 24 wherein the combustion effluents are cooled against boiler feed water in line 26 which then produces steam in line 28. In the waste heat boiler 24 the reaction effluents are converted from one form of sulfur species to another according to the following equations:

$$S_2 \rightarrow 1/3\ S_6$$

$$S_2 \rightarrow 1/4\ S_8$$

The cooled effluent from the waste heat boiler in line 30 is at a temperature of 600° F. and a pressure of 24 psia. It is then introduced into the first condenser 32 wherein the effluent is again heat exchanged to cool the effluent against boiler feed water in line 34 which produces steam in line 36. Liquid sulfur is condensed out in line 38 constituting 77.4% of the sulfur in the feed, and the gaseous combustion effluent stream is removed in line 40. Approximately 45% of the effluent stream 40 is then split into line 44 as an intermediate recycle stream taken immediately downstream from the condenser 32 and recycled as the suction fluid through ejector 46 to be fed in line 18 into the acid gas feed line 10 in order to moderate the temperature of the flame in the burner 20. This stream again is at a temperature of 350° F. Alternately, stream 18 can be introduced into burner 20, line 12 or line 14. The ejector is powered by a motive fluid 45 selected from high pressure steam, air, nitrogen, carbon dioxide, sulfur dioxide or other compatible gases. The ejector is preferably located at an elevation above the first condenser 32 and the reactor furnace 22 to allow all piping to be self draining to the first condenser 32.

Alternately, the recycle stream in line 44 can be taken from downstream of the reaction furnace's waste heat boiler 24 and passed through a discrete condenser (not shown) similar in function to condenser 32 before being recycled through ejector 46.

The remaining stream in line 42 is then reheated in a reheater heat exchanger 48 with process steam. The stream now in line 50 has been reheated to a temperature of 430° F. and is then introduced into a catalytic converter reactor 52 wherein additional quantities of hydrogen sulfide and sulfur dioxide are reacted to produce sulfur and water according to the following equations:

$$2H_2S + SO_2 \rightarrow 3/6\ S_6 + H_2O$$

$$2H_2S + SO_2 \rightarrow 3/8\ S_8 + 2H_2O$$

The reacted stream now in line 54 is introduced into a second condenser 56 which again cools the effluent stream with boiler feed water in line 58 to produce additional steam in line 60. Additional elemental sulfur is recovered in line 62 constituting 14.3% of the sulfur in the feed to the process, wherein the sulfur species produced in the catalytic reaction are converted to high molecular weight sulfur species and then are condensed to elemental sulfur according the following reactions:

$$S_6 \rightarrow 6\ S_1$$

$$S_8 \rightarrow 8\ S_1$$

The stream in line 64 is at a temperature of 340° F. and a pressure of 22 psia. It is introduced into reheater heat exchanger 66 and heated with process steam to produce a stream in line 68 at 420° F. This stream is introduced into a second catalytic converter 70 wherein a similar catalytic reaction between hydrogen sulfide and sulfur dioxide occurs with the effluent in line 72 going to yet another condenser 74 which is cooled with boiler feed water 76 to produce steam in line 78. An additional quantity of liquid elemental sulfur is removed in line 80 constituting 4.9% of the sulfur in the feed to the process.

The effluent stream in line 82 is at 330° F. and 20 psia before it is reheated in reheater heat exchanger 84 with process steam to produce a stream in line 86 at 400° F. and 20 psia. This stream is introduced into the third and final catalytic reactor 88 to react substantially the remaining hydrogen sulfide and sulfur dioxide to produce sulfur species which are removed in line 90 wherein that stream is introduced into a condenser 92 cooled by boiler feed water in line 94 producing steam in line 96. Further elemental sulfur in liquid form is removed in line 98 constituting 1.7% of the sulfur in the feed to the process, while a final effluent is recovered in line 100 comprising predominantly steam, nitrogen, carbon dioxide, hydrogen and residual hydrogen sulfide and sulfur compounds amounting to 1.4 mole % of the effluent stream.

The stream in line 100 is introduced into a tailgas coalescer 102 wherein additional sulfur is removed in line 104. The residual stream in lines 106 and 107 is then introduced into a tail gas cleanup unit (TGCU) where the bulk of the residual sulfur constituents of 106 are recovered to meet sulfur emission environmental standards typically by conversion to hydrogen sulfide which is returned to the acid gas feed 10. Alternately, the tail gas is sent to an incinerator burner 112 that is fired with natural gas in line 108 and air in line 110. The materials are then vented in stack 114, at an acceptable sulfur content level, as an effluent 116 to the atmosphere.

The present invention as described above is exemplary of only one embodiment of the invention which incorporates oxygen enrichment with an intermediate recycle stream to provide: a) a degree of freedom in oxygen enrichment, b) an increase in throughput of a Claus plant to very high levels, c) a decrease in overall pressure drop through the Claus plant system, d) reduced effluent flow to and through the tailgas process unit, and e) heightened percent recovery of sulfur from the feed gas stream, wherein the intermediate recycle provides a unique moderation of flame temperatures in an oxygen enriched Claus plant increased safety, reduced capital costs and reduced mechanical complexity in pressurizing the recycle stream.

The present invention has been described with regard to one preferred embodiment, but those skilled in the art will be capable of contemplating other variants which are deemed to be within the scope of the invention, which scope should be ascertained from the claims which follow.

What is claimed is:

1. In a process for recovering sulfur from a feed gas stream rich in hydrogen sulfide wherein the gas stream is partially combusted with an oxygen-enriched gas in a Claus reaction furnace zone, the combustion effluent is cooled with the attendant condensation and separation of sulfur in a first condensation zone and the remaining effluent stream is passed through at least one stage of reheating, conversion in a catalytic Claus reaction zone and cooling with attendant condensation and separation of sulfur in an additional condensation zone, and recycling a portion of the combustion effluent to the reaction furnace zone in order to moderate the temperature of the reaction furnace zone, the improvement comprising performing the recycle with the motive power of a high pressure stream in an ejector where the recycle stream is the suction stream to the ejector.

2. The process of claim 1 wherein three stages are used to process said remaining effluent stream.

3. The process of claim 1 wherein the feed gas stream has a hydrogen sulfide content in the range of 60 to 100 mole %.

4. The process of claim 1 wherein the feed gas stream has a hydrogen sulfide content of 80 to 100 mole %.

5. The process of claim 1 wherein the oxygen-enriched gas has an oxygen content of greater than 21 mole %.

6. The process of claim 1 wherein the oxygen-enriched gas has an oxygen content of 32 to 70 mole %.

7. The process of claim 1 wherein the recycle stream constitutes 5 to 60% of the combustion effluent stream.

8. The process of claim 1 wherein the temperature of the reaction furnace zone is in the range of 2400 to 2800° F.

9. The process of claim 1 wherein two or more ejectors in parallel are used.

10. The process of claim 1 wherein the portion of the combustion effluent for recycle is from the first condensation zone.

11. The process of claim 1 wherein the portion of the combustion effluent for recycle is taken from downstream of the Claus reaction furnace zone waste heat boiler and passed through a discrete condenser before being recycled.

12. The process in accordance with claim 1 wherein the high pressure stream is steam.

* * * * *